Sept. 5, 1967
TOSHIO INOUE
3,340,117
METHOD OF MAKING A MOLDED INSULATING CYLINDER
Filed April 19, 1963
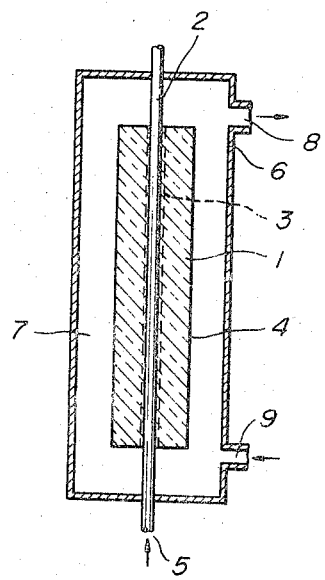
INVENTORS
Toshio Inoue
Takashi Tahara
Tokio Isogai
By Paul M. Craig, Jr.
ATTORNEY United States Patent Office 3,340,117
Patented Sept. 5, 1967

3,340,117
METHOD OF MAKING A MOLDED
INSULATING CYLINDER
Toshio Inoue, Takashi Tahara, and Tokio Isogai, Hitachi-shi, Japan, assignors to Hitachi, Ltd., Tokyo, Japan, a corporation of Japan
Filed Apr. 19, 1963, Ser. No. 274,239
4 Claims. (Cl. 156—184)

The present invention relates to a new and improved method of making molded insulating tubes and like articles including molded condenser bushings in which a tubular lamination of a fibrous material impregnated and/or coated with a resin material is so heated as to harden radially from inside to outside.

In recent years, the progress of the superhigh-voltage power transmission technology has been tremendous, and now transmission systems with a rated voltage as high as 400 kilovolts are being put into practice. This means further increase in unit capacity and hence unit weight and size of the power system, electrical equipment including generators and transformers. Accordingly, insulating tubes and other fittings for such power equipment will necessarily be increased in size thus contributing to the overall increase in size and weight of the equipment. It is obvious that such increase in size and weight is undesirable when viewed from material costs, transportation, manufacturing, and other standpoints. With these considerations in mind, it is important to design insulating cylinders as compact as possible. With the so-called cylindrical insulators, such as molded condenser bushings, the situation is the same. The manufacture of cylindrical insulators requires higher levels of skill and technology to obtain products of satisfactory electrical and mechanical characteristics, as the insulating layer of such product is increased in thickness.

In manufacturing such insulating cylinders, therefore, it is necessary to use materials having excellent electrical and mechanical properties, and utmost care and wide study are required, particularly in the selection of the resinous and fibrous materials. It is critically important to obtain an insulating layer free from cracks or voids between laminae.

Resins invariably shrink when hardened as their inherent characteristic. Even resins of the epoxy type, which is now considered as the least susceptible to cure shrinkage, exhibit shrinkage of the order of approximately 4%. In view of this, it is impossible to completely eliminate the shrinkage of resins in their curing operation.

Even with such limited shrinkage as 4%, the total shrink of resin material cannot be neglected particularly when the thickness of the laminated article is substantial. The total shrink of the article is often enough to reduce the binding strength between the resin material and the fibrous material impregnated therewith to such an extent that the laminae of the fibrous material are split apart to form cracks or voids in the lamination.

It is considered most important with the case of molded insulating cylinders, molded condenser bushings and like articles to eliminate such cracks or voids since these defects often cause corona discharge and further, result in dielectric breakdown.

A so-called pressure molding process is known in which the object to be cured is placed in a pressure vessel and cured while being continuously subjected to a fluid pressure introduced into the space around the object. It has been found that by use of this process the occurrence of cracks or voids due to the shrinkage of resin material can be prevented with considerable success as the fibrous material impregnated with the resin is continuously held under the fluid pressure acting upon the object from its outside.

This process, however, involves a drawback that a considerably high fluid pressure is required in order to obtain a satisfactory result, and this requires an unusually heavy pressure vessel and large appurtenances, which are clumsy to handle and operate.

In another known process of making insulating cylinders of this kind, the base material to be impregnated is wrapped in a flexible shielding bag, and a supply of degassed thermosetting material is injected into the bag after the bag has been evacuated. Finally, the base material impregnated in the bag is placed in a pressure vessel to be subjected to heat and pressure and thus hardened.

In both of the above described processes, the object to be cured is externally heated while at the same time being subjected to external pressure with the intention of avoiding the difficulties due to the cure shrinkage of resin material. It is seen, however, that the hardening and hence shrinkage invariably proceed from the outside of the object to its interior. Therefore, as the hardening proceeds, the inner unhardened portion of the insulating material is outwardly stressed in tension to be exfoliated, and cracks or voids are formed in groups particularly in the vicinity of the mandrel on which the insulating layer is mounted.

In view of the above, the present invention has for its primary object to provide a method of making molded insulating cylinders which involves no danger of cracks or voids occurring in the cylinder wall despite the shrinkage of the resin material being cured.

According to the present invention, a method of making molded insulating cylinders comprises the steps of forming about a mandrel which can be heated an insulating layer composed of a thermosetting resin material and a fibrous material impregnated therewith, enclosing said insulating layer with an envelope for preventing the resin material from flowing out of said insulating layer, and heating said mandrel to cause said insulating layer to harden progressively from inside to outside.

According also to the present invention, a method of making molded insulating tubes comprises the steps of forming about a mandrel which can be heated an insulating layer composed of a thermosetting resin material and a fibrous material impregnated therewith, enclosing said insulating layer with a flexible shielding bag, and applying fluid pressure to said insulating layer through the intermediary of said flexible shielding bag while heating said mandrel to cause said insulating layer to harden progressively.

According to a specific feature of the invention, the insulating layer formed about the mandrel is hardened by heat of the mandrel and heat of the fluids which press said layer.

In carrying out the method of the invention, a parting sheet may be wound about the mandrel if desired preliminarily to the formation of an insulating layer thereon to facilitate the removal of the insulating layer from the mandrel after it has been hardened.

The most important feature of the present invention is the use of a mandrel which can be heated. Conveniently, a heating device such as an electrical heater is incorporated in the mandrel, or provision is made for directing a flow of hot water or steam 5, through the mandrel. The secondary feature of the invention is the use of an envelope to enclose the insulating layer formed on the mandrel for the purpose of preventing outflow of the thermosetting resin from the layer.

According to the present invention, such procedure as the vacuum drying of the base or fibrous insulating material or the injection of varnish therein is substantially facilitated because of the above features of the invention, as will be described below, whereas such procedure has not been so easy in the conventional method of making insulating cylinders in which the base material to be impregnated is wrapped in a flexible shielding bag and subjected to external heat and pressure. The conventional method has involved a deficiency that is impossible to completely eliminate the formation of voids as the presence of liquid or gaseous substances in the base material acts as a cause of such void formation. In the event that the fibrous material is vacuum-treated after it has been wrapped in a flexible bag, the material cannot be degassed to any satisfactory extent unless a considerably high vacuum is used as the degassing effect cannot reach the depth of the material. It is practically impossible to completely degas the material even under extreme vacuum.

In contrast, according to the present invention, it is not always necessary to wrap the material in a flexible bag for the purpose of subjecting the material to fluid pressure and the envelope used to prevent the thermosetting resin from flowing out need not take the form of a closed bag but may have an opening, for example, at the top to facilitate the vacuum drying and varnish injection.

In this connection, the injection of varnish is required not only in case the fibrous material alone is wound about the mandrel but also in case a resin-coated sheet is wound together with the fibrous material when it is desirable to fill up the space formed by the shrinkage of the insulating layer. It is to be understood that in the latter case the injection of varnish can be omitted according to circumstances.

According to the present invention, the insulating material may be cured under pressure when desired by wrapping the material in a flexible envelope and placing it in a pressure fluid for the purpose of further ensuring the prevention of occurrence of cracks or voids in the material. The fluid for such pressurization may be selected from a wide range of liquid and gaseous materials including air, nitrogen gas, oil and water.

Contrariwise to the foregoing, the occurrence of voids in the insulating layer may also be effectively prevented by wrapping the material with a flexible sheeting which is pervious to gaseous fluid but impervious to liquid, placing the wrapped material in a pressure vessel, and heating the mandrel carrying the insulating layer to harden the latter progressively from inside to outside while evacuating the vessel to a high vacuum to remove harmful fluid substances such as air from the interior of the insulating layer.

In either instance, it is necessary that the temperature of the insulating layer adjacent to the mandrel is higher than that of the peripheral portion of the layer so that the hardening occurs progressively through the layer from its axial region to its periphery.

The temperature to which the mandrel is to be heated can hardly be fixed but is to be selected in accordance with the type of the resin used.

The flexible sheeting for covering the insulating layer is desirably made of a material which is more or less heat-resistant, for example, a resin available under the tradename of Mylar, Teflon or Lumilar.

An apparatus employed in practical application of the method according to the invention will now be described with reference to the accompanying drawing, in which a mandrel 2 which can be heated extends axially through a pressure vessel 6 having an outlet 8 and an inlet 9 at opposite ends.

Reference numeral 1 designates an insulating layer comprised of a fibrous material impregnated with a thermosetting resin material. The insulating layer 1 is formed by winding the fibrous material coated with the thermosetting resin about the mandrel 2, or by first winding the fibrous material alone about the mandrel and then subjecting it to vacuum drying followed by the injection of the resin material. Alternatively, the fibrous material may be wound while being coated with the resin material. The insulating layer 1 thus formed on the mandrel 2 is enclosed with a flexible shielding bag 4 so as to prevent the resin composition in liquid form from flowing out of the layer 1. In case the envelope 4 is solely intended to prevent the outflow of the resin material, it may not be flexible and may have an opening at the top.

If desired, a parting film 3 is wound about the mandrel in advance of the formation of the insulating layer thereon, as indicated by the dotted lines.

In addition to the procedure described above, the insulating layer may be wrapped with a flexible shielding envelope and placed in the pressure vessel 6 so as to be subjected to the pressure of fluid 7 fed in and out of the vessel at 9 and 8, respectively. In this manner, the shrinkage of the resin material can be effectively filled up to obtain a further improved insulating tube.

The shielding envelope may be made to shrink with the shrinking of the resin or be made of a heat-shrinkable material, if desired.

As apparent from the foregoing, the present invention is characterized in that the hardening of the insulating layer is started along the inner periphery thereof, and, particularly when the insulating layer is of substantial thickness, pressure is applied invariably to the outer periphery of the layer through the medium of a flexible shielding envelope in which the insulating layer is wrapped so that the occurrence of cracks or voids in the layer is effectively prevented by the flowing-in of resin material or the application of compressive force thereto. Such external pressure need not always be applied particularly when the insulating layer is thin.

Some practical examples will next be described for better understanding of the invention; however, it is to be clearly understood that this invention is in no way limited thereto but is of the full scope of the appended claims.

*Example 1*

A cotton tape of 0.25 mm. thickness was wound about a brass tube of 25.4 mm. diameter to a thickness of 25 mm. with no resin coating, and a Mylar sheet of 0.1 mm. thickness was wrapped to cover the entire tape winding as a shielding material therefor. The entire assembly obtained was placed in a thermostatic vessel to be preliminarily dried under atmospheric pressure and at approximately 100° C. At the same temperature, the pressure was then reduced to $10^{-3}$ mm. Hg to dry the lamination under vacuum for 70 hours followed by vacuum injection of an epoxy resin varnish (Araldite F made by Ciba). With no external pressure applied, the mandrel was heated to 130° C. for 24 hours for precuring the insulating layer. Thereafter, the assembly was placed in a thermostatic vessel to be held at 120° C. for 12 hours for after-curing. The insulating cylinder obtained was free from any cracks or voids and electrically and mechanically excellent.

*Example 2*

A tape of fibrous material having a thickness of 0.25 mm. was wound about a brass tube of 38.1 mm. diameter to a thickness of 50 mm. with no resin coating. The tape winding was placed in a thermostatic vessel to be preliminarily dried under atmospheric pressure and at approximately 100° C. At the same temperature, the pressure was then reduced to $10^{-3}$ mm. Hg to dry the lamination under vacuum for 70 hours followed by vacuum injection of an epoxy resin varnish (Araldite F). The lamination with a surplus of the epoxy resin varnish was covered with a Mylar sheet of 0.1 mm. thickness and the entire assembly was immersed in a hot bath of turbine oil held at 80° C. while the mandrel was heated to 130° C. and the lamination was thus precured in 12 hours. Then, the heating of the mandrel was interrupted and the turbine oil bath was heated to 120° C. and held at the temperature for 12 hours for after-curing of the lamination. Despite of such substantial wall thickness, the insulating cylinder obtained through the hardening process of such relatively short duration exhibited excellent characteristics.

What is claimed is:

1. A method of making a molded insulating cylinder which comprises applying an insulating layer composed of a thermosetting resinous material and a fibrous material to a mandrel, enclosing said insulating layer in a flexible shielding material, applying fluid pressure to said insulating layer from outside the flexible shielding material and heating said mandrel, thereby establishing a temperature gradient of decreasing temperature from the mandrel to the outside surface of the insulating cylinder which causes said insulating layer to harden progressively from the inside to the outside of the molded insulating cylinder.

2. The method of claim 1, wherein a parting sheet is wound around the mandrel prior to applying the insulating layer to facilitate removal of the insulating layer from the mandrel after it has been hardened.

3. The method of claim 1, wherein said insulating layer is also heated through the intermediary of the fluid under pressure.

4. The method of claim 1, wherein the thermosetting resin is an epoxy resin.

References Cited

UNITED STATES PATENTS

| | | | |
|---|---|---|---|
| 1,627,209 | 5/1927 | Smith | 264—236 |
| 1,808,381 | 6/1931 | Sherts | 156—382 |
| 2,906,317 | 9/1959 | Keyes | 156—190 X |
| 2,945,638 | 7/1960 | Crawford et al. | |
| 2,976,889 | 3/1961 | Cannady | 156—330 X |

EARL M. BERGERT, *Primary Examiner.*

H. F. EPSTEIN, *Assistant Examiner.*